United States Patent [19]
Celerier et al.

[11] Patent Number: 5,304,057
[45] Date of Patent: Apr. 19, 1994

[54] APPARATUS FOR SIMULTANEOUSLY MOLDING PORTIONS OF SEPARABLE ARTICLE

[75] Inventors: Eric P. G. Celerier, Gennevilliers; Philippe Henrio, Lardy, both of France

[73] Assignee: Societe Nationale d'Etude et de Construction de Moteurs d'Aviation (S.N.E.C.M.A.), Paris, France

[21] Appl. No.: 70,672

[22] Filed: Jun. 2, 1993

[30] Foreign Application Priority Data

Jun. 3, 1992 [FR] France ............... 92 06697

[51] Int. Cl.⁵ ........................... B29C 33/00
[52] U.S. Cl. ................... 425/389; 156/245; 156/382; 264/314; 425/405.1; 425/451.9
[58] Field of Search ............. 156/156, 245, 285, 382; 264/257, 314; 425/195, 389, 392, 388, 405.1, 405.2, 451.9, DIG. 14, DIG. 19, DIG. 44, DIG. 60

[56] References Cited

U.S. PATENT DOCUMENTS

| | | | |
|---|---|---|---|
| 1,616,958 | 2/1927 | Huetter | 425/389 |
| 2,722,962 | 11/1955 | Hampshire et al. | |
| 3,431,331 | 3/1969 | Pincus et al. | 425/405.1 |
| 3,814,653 | 6/1974 | Heier | 156/285 |
| 4,310,372 | 1/1982 | Janssen et al. | 156/245 |
| 4,483,670 | 11/1984 | Yamamoto et al. | 425/389 |
| 4,681,651 | 7/1987 | Brozovic et al. | 156/245 |
| 4,693,678 | 9/1987 | Von Volkli | 425/405.1 |
| 5,015,168 | 5/1991 | Boime et al. | 425/389 |
| 5,256,366 | 10/1993 | Wejrock et al. | 425/405.1 |

FOREIGN PATENT DOCUMENTS

| | | | |
|---|---|---|---|
| 2490993 | 4/1982 | France | |
| 1243956 | 7/1986 | U.S.S.R. | 425/389 |
| 2184053 | 6/1987 | United Kingdom | |

*Primary Examiner*—Charles S. Bushey
*Attorney, Agent, or Firm*—Bacon & Thomas

[57] ABSTRACT

An apparatus for simultaneously molding separate portions of an article which may be subsequently assembled to form the complete separable article. The apparatus includes separate mold portions which, when assembled, define a molding cavity in which each of the mold portions has an outwardly extending flange. The mold portions are fastened together such that the flanges are spaced apart a distance at least twice as great as the thickness of the article to be molded. The mold portions extend along a longitudinal axis and each defines a molding surface which extends around the axis less than 360°. When the mold portions are assembled, the molding surfaces extend completely around the longitudinal axis. The mold also includes silicone bead elements extending along the longitudinal axis in the space between the spaced apart flanges. The bead elements also define molding surfaces which bear against a portion of the molding material and urge it into contact with the surfaces of the flanges to form flanges on the molded portions of the article.

12 Claims, 4 Drawing Sheets

APPARATUS FOR SIMULTANEOUSLY MOLDING PORTIONS OF SEPARABLE ARTICLE

BACKGROUND OF THE INVENTION

The present invention relates to a method and an apparatus for simultaneously molding portions of a separable article, more particularly such a method and apparatus for molding objects of revolution made from composite material.

Gas turbine engines for aeronautical applications, such as turbofan engines, and turbojet engines both with and without afterburners typically have an exhaust duct which is made of a metallic material, such as a titanium. In such aeronautical applications, it is highly desirable that all parts of the aircraft, including the power plant, be as light in weight as possible in order to increase the performance of the aircraft, and to make it more efficient. Titanium has been typically selected as the material for the engine exhaust gas duct due to its relatively high strength and relatively low weight.

The weight of the engine assembly could be further reduced by making this duct out of a composite material, rather than a metallic material, such as titanium. However, the production of such an article has encountered heretofore insurmountable problems. In order to obtain access to the internal components of the engine, the exhaust duct must be comprised of at least two sections, which are separable in order to permit such access.

French Patent 2,490,993 describes the molding of a hollow body from laminated material in which the mold consists of at least two mold portions which define a molding cavity which has the outside shape of the hollow body to be molded. This patent also discloses the use of an expansible pouch or bag located within the molding cavity whose external shape corresponds to the inside shape of the hollow molded body. The process described in this document consists of separately covering each mold portion with a pre-impregnated composite mat (prepreg) or by impregnating the fabric portion of the composite material with a resin after placing it into the mold portions. The mold portions are then assembled together with the expansible pouch located within the mold. By increasing the temperature of the mold assembly, the expandable pouch is expanded to thereby press the impregnated composite material against the wall of the mold portions and the composite material is cured. Although this method allows making complex shaped hollow articles, such as pipes, tubes, or the like, it does not describe the making of such an object comprising separable portions.

Obviously, it would be feasible to manufacture the two separate portions of the article separately in different molds. However, in order to ensure that the separate portions of the article have identical properties, it is mandatory that they be manufactured simultaneously in the same mold.

SUMMARY OF THE INVENTION

A method and apparatus are disclosed for simultaneously molding separate portions of an article which may be subsequently assembled to form the complete separable article. The apparatus includes separate mold portions which, when assembled, define a molding cavity in which each of the mold portions has an outwardly extending flange. The mold portions are fastened together such that the flanges are spaced apart a distance at least twice as great as the thickness of the article to be molded. The mold portions extend along a longitudinal axis and each defines a molding surface which extends around the axis less than 360°. When the mold portions are assembled, the molding surfaces extend completely around the longitudinal axis.

The mold also includes silicone bead elements extending along the longitudinal axis in the space between the spaced apart flanges. The bead elements also define molding surfaces which bear against a portion of the molding material and urge it into contact with the surfaces of the flanges to form flanges on the molded portions of the article.

A method for simultaneously molding separate portions of the article involves separating the mold portions, placing a molding material, such as a prepreg of composite material in the portions such that the prepreg bears against the molding surfaces and assembling the first and second mold portions together with the bead elements and a vacuum pouch located within the molding cavity. The mold portions are assembled with the silicone bead elements extending along the space defined between the adjacent flanges.

The mold portions define conduits through which a vacuum may be drawn within the mold cavity to cause the vacuum pouch to expand, thereby pressing the molding material against the molding surfaces of the mold portions. The assembly is placed in an autoclave and the vacuum is drawn within the molding cavity while the assembly is heated so as to cure the molding material. Following the curing of the molding material, the mold portions are separated and the molded objects are removed.

The portions of the molded object are formed with flanges such that they may be releasably attached together. Since both portions of the article were formed under the exact same molding conditions, the properties of the separate portions are identical.

The present invention enables large diameter objects to be manufactured without requiring commensurately large manufacturing devices. The invention also substantially lowers the weights of gas turbine engines and reduces their manufacturing costs, since the molding apparatus is reusable in mass production.

DETAILED DESCRIPTION OF THE PREFERRED EMBODIMENTS

Figure 1:
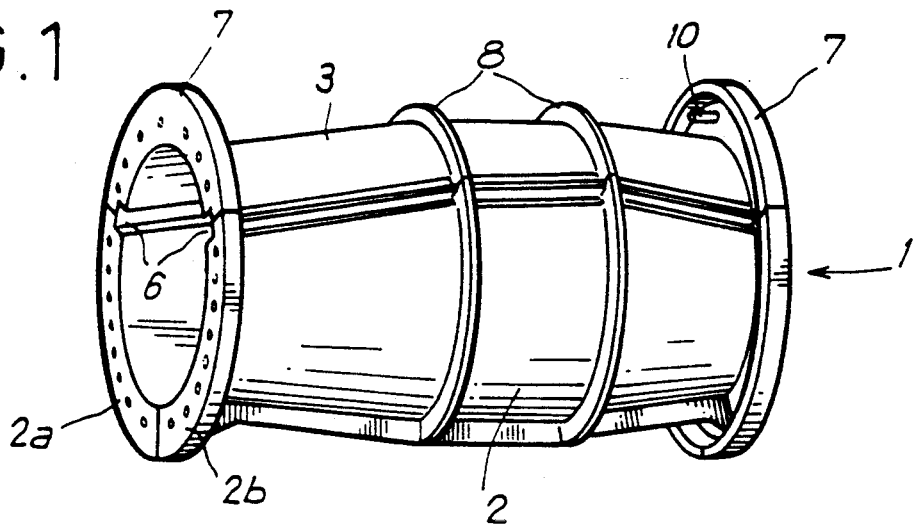
FIG. 1 is a perspective view of the assembled mold according to the present invention.
Figure 2:
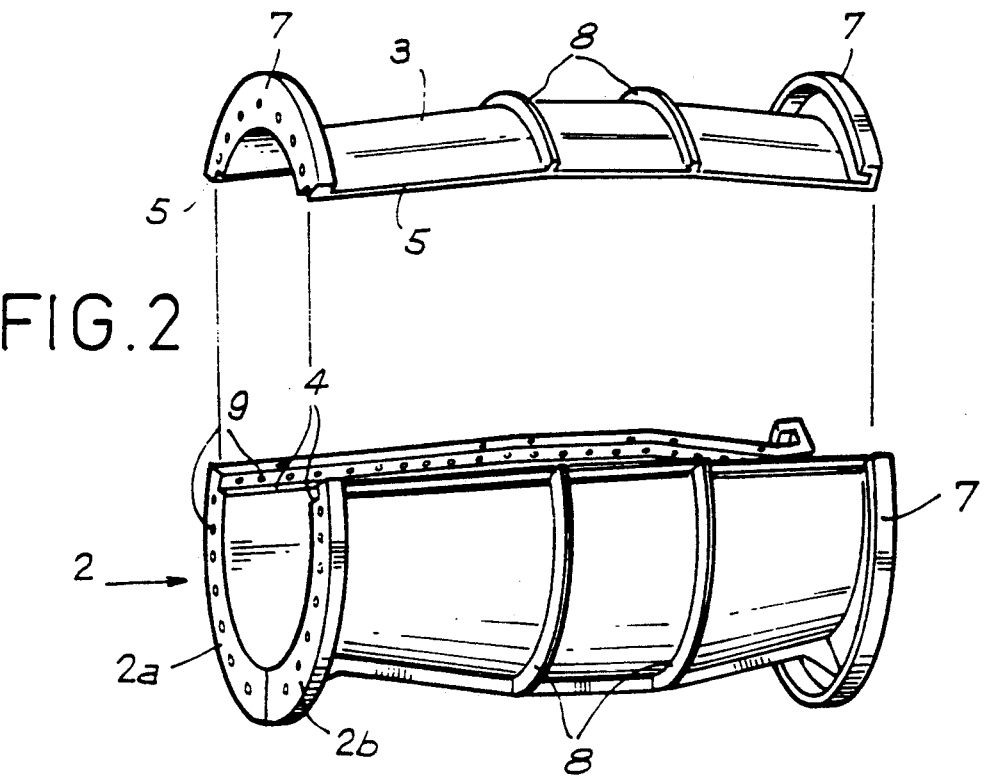
FIG. 2 is an exploded, perspective view of the mold shown in FIG. 1.

The Figures illustrate a mold for molding a large diameter object of revolution from an organic matrix composite material with the object comprising two separable portions joined by fasteners extending through flanges formed on the molded portions.

The mold 1 comprises mold portions 2 and 3 extending along a longitudinal axis and defining inner molding surfaces. The lower portion 2 defines a molding surface which extends about the longitudinal axis through an arc of approximately 240°, while the upper portion 3 has a molding surface which extends about the longitudinal axis through an arc of approximately 120°. The mold portion 2 may be made of two parts 2a and 2b which may be separated in order to remove the molded object therefrom. The mold parts 2a and 2b may be connected by known means.

Flanges 4 and 5 extend outwardly from the respective mold portions 2 and 3 near their joint plane and extend substantially along the entire lengths of these mold portions. Mold portions 2 and 3 also comprise an annular end flange 7 at both ends. Circumferential reinforcing flanges 8 may also be provided around the mold portions to increase the strength of the mold.

Figure 3:
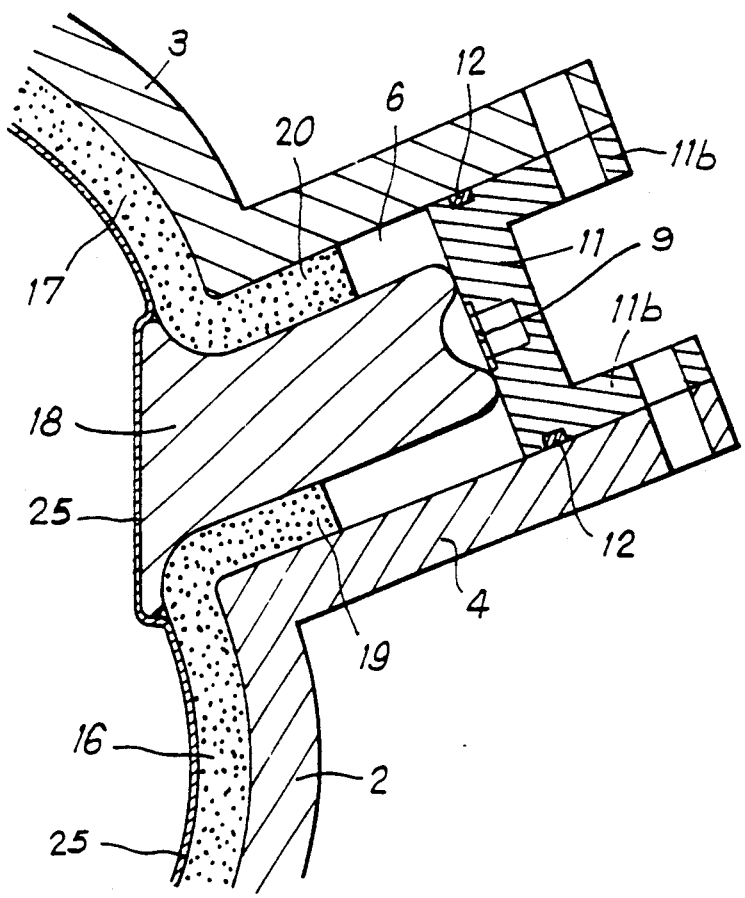
FIG. 3 is a partial, cross-sectional view taken through the mold according to the present invention across the flange area.
Figure 4:
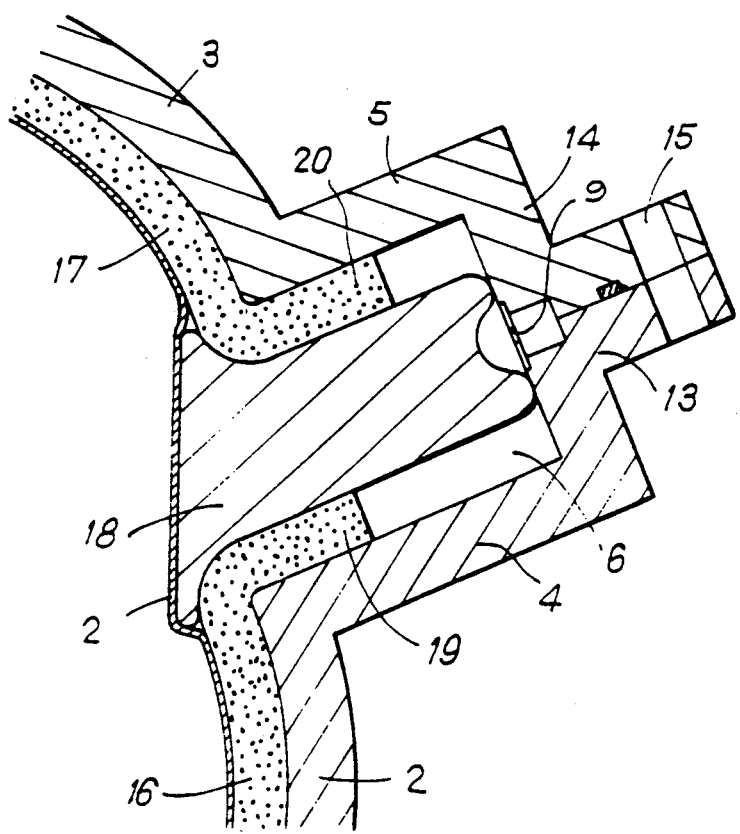
FIG. 4 is a partial, cross-sectional view similar to FIG. 3 illustrating a second embodiment of the flanges of the mold according to the present invention.

The walls of mold portions 2 and 3 define conduits therein which communicate with the space 6 (as illustrated in FIGS. 3 and 4) between adjacent flanges 4 and 5 through orifices 9. One or more connecting tubes 10 (see FIG. 5) are located on the annular flange 7 in order to connect the conduits and orifices 9 to an external vacuum source (not shown).

In a first embodiment, as illustrated in FIG. 3, the flanges 4 and 5 of the mold portions 2 and 3 are attached to each other by a generally "U"-shaped connector 11 which has legs 11b attached to the flanges 4 and 5 by known fasteners such as bolts, screws, or the like. Seals 12 are operably located between the connector 11 and the inner surfaces 4 and 5 to seal the interior of the mold.

In a second embodiment, as illustrated in FIG. 4, the flanges 4 and 5 are formed with angled portions 13 and 14, respectively such that the flanges 4 and 5 are spaced apart and define therebetween a space 6. The angled portions 13 and 14 may define holes 15 through which known fasteners may be inserted to assemble the mold portions. Again, a seal 12 may be interposed between the mating angled portions 13 and 14 to seal the interior of the mold. Seal 12 may be made of a silicone material.

Orifices 9 communicate the interior space 6 defined between the flanges 4 and 5 with a conduit, which is defined by the "U"-shaped connector 11, or by the angled portions 13 and 14 and which is connected to a vacuum source via connector 10.

As can be seen, the interior surfaces of mold portions 2 and 3 constitute molding surfaces, as do the facing surfaces of adjacent flanges 4 and 5. Flanges 4 and 5 are separated by a space 6 which is greater than twice the thickness of the flanges 19 and 20 to be formed on the molded article.

The method of utilizing this mold comprises first separating the mold portions and placing them such that their molding surfaces face upwardly. The molding surfaces are then covered with prepregs of a composite material from which the separate portions 16 and 17 of the article are to be made. As is well known in the art, the prepregs placed on the molding portions may be covered with a plastic film and draining cloths.

The smaller mold portion (in this particular instance mold portion 3) is placed over the other mold portion 2 and silicone bead elements 18 are inserted into the spaces 6 between the prepreg layers which form the flanges 19 and 20 of the finished article. As can be seen, these portions 19 and 20 extend partially over the interior surfaces of flanges 4 and 5.

The silicone bead elements 18 have molding surfaces which engage the prepreg portions 19 and 20. Since silicone material will expand when heated, such expansion will cause compression of the composite material within the spaces 6 during the curing steps and will urge these portions of the composite material against the molding surfaces of the flanges 4 and 5. Once the silicone beads 18 are in position, the mold portions 2 and 3 are affixed together, such as with bolts and conical centering pins.

Figure 5:
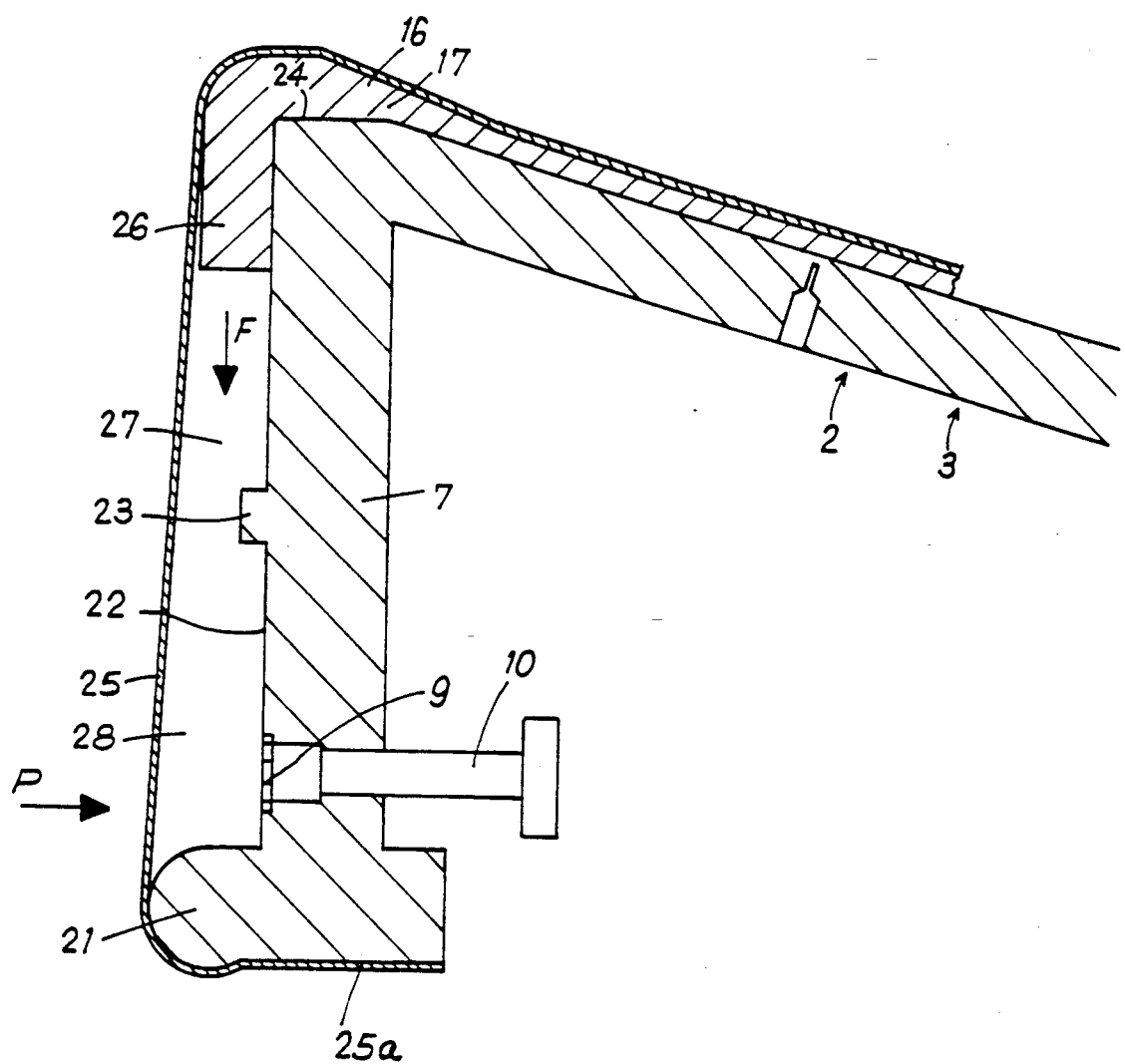
FIG. 5 is a partial, longitudinal cross-sectional view showing an end of one of the mold portions.

As best seen in FIG. 5, the end flange 7 defines a boss portion 21 extending from the outer side 22 of the mold 1. A projection 23 extending outwardly a distance less than that of the boss 21, also extends outwardly from the outer surface 22 between the boss 21 and the inner wall 24.

Once the two mold portions 2 and 3 have been assembled, a vacuum pouch 25 is placed inside the mold. The vacuum pouch 25 has a generally tubular configuration in which the ends 25a are hermetically sealed around the annular flanges 7, as illustrated in FIG. 5. The vacuum pouch 25 is applied against the draining cloths and the silicone bead elements 18 and the mold is then placed into an autoclave. A vacuum is drawn in the interior space defined by mold portions 2 and 3 and the vacuum pouch 25 such that, during curing of the composite material, the vacuum pouch 25 expands, thereby forcing the prepreg composite material against the inside wall or molding surface of the mold portions 2 and 3. Such expansion of the vacuum pouch also urges the silicone bead elements 18 into the spaces 6. The mold is then heated to a prepreg baking temperature of approximately 315° C. and is thereafter lowered to a temperature of approximately 180° C. to cure the composite material. Quite obviously, these parameters will vary depending upon the specific composite material utilized with the mold. The mold portions may then be disassembled and the molded portions 16 and 17 removed from the mold. Since the molded article portions 16 and 17 have flanges 19 and 20 integrally molded thereon, they may be easily assembled by known fasteners extending through the flanges 19 and 20.

If the prepreg resin solidifies at approximately 250° C., the final dimensions of the object to be manufactured will be set at this temperature. The dimensions of the mold are calculated for the geometry at the temperature of 250° C. taking into account the thermal expansion of the mold portions at this temperature.

Obviously, the molding surface on the interior of the mold 1 may further define depressions or clearances to form projections on the outside of the molded portions 16 and 17, if desired.

As illustrated in FIG. 5, the portions of the molded object may be molded with an integral front flange 26. The making of this front flange 26 is assisted by the enlarged boss portion 21. During isostatic pressurization and to prevent the composite material from wrinkling near the front flange 26, a traction force in the direction of arrow F is exerted thereon by the vacuum pouch 25. As can be seen, the pressure P applied to the vacuum pouch 25 in the autoclave tensions the vacuum pouch, which then pulls on the composite material in the direction of arrow F.

A clearance is provided on the outer side 22 of the end flange 7 between the boss portion 21 and the front flange 26 which is in two portions 27 and 28 separated by the projection 23. Clearance 27 receives the residues of solvent, resin, etc. which drain into this clearance during pressurization. Clearance 28 comprises a safety receptacle in the event that the residues move beyond the projection 23. Clearances 27 and 28 are needed to prevent the residues from clogging the vacuum orifices 9 and the connector 10.

Figure 6:
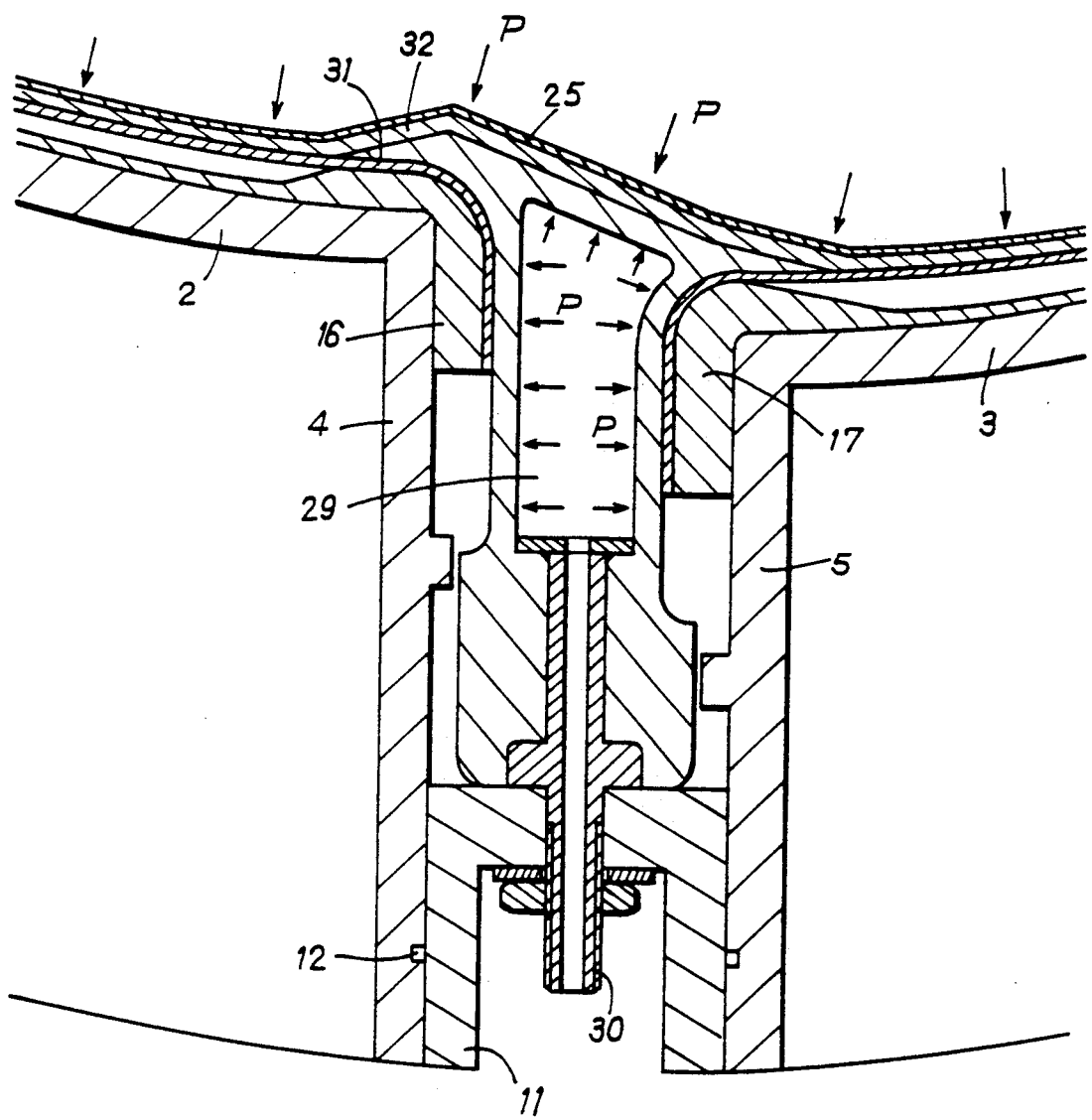
FIG. 6 is a partial, cross-sectional view similar to FIGS. 3 and 4, illustrating a third embodiment of the flanges according to the present invention.

FIG. 6 illustrates an alternative embodiment in which the silicone bead element 18 defines an internal cavity 29 which is in communication with nozzle 30, which extends outside the mold 1. In this embodiment, the prepreg laminate 16 and 17 is no longer compacted in the space 6 solely by the expansion of the silicone bead element 8. The internal cavity 29 may be supplied with a pressurized fluid through nozzle 30 to exert a pressure P against the inside of the silicone bead element 8 which urges it outwardly so as to compress the portions of the prepregs 16 and 17 within the space 6. This embodiment enables the silicone bead element 18 to be placed between the mold portions 2 and 3 more easily, since it may be rigidly affixed to the mold 1 by means of nozzle 30 extending through the connector 11. This embodiment also enables greater compaction of the prepreg portions in the space 6 due to the high pressure P exerted on the internal cavity of the silicone bead element 18. FIG. 6 also clearly illustrates how the plastic film 31 and the draining cloth 32 are arranged in relation to the prepreg layers.

The foregoing description is provided for illustrative purposes only and should not be construed as in any way limiting this invention, the scope of which is defined solely by the appended claims.

We claim:

1. Apparatus for simultaneously molding portions of a separable article having a plurality of separable portions comprising:
   a) a first mold portion having a first flange extending outwardly therefrom, said first mold portion and first flange defining a first portion of a molding cavity;
   b) a second mold portion having a second flange extending outwardly therefrom, said second mold portion and second flange defining a second portion of a molding cavity; c) connection means for connecting the first and second mold portions together such that the first and second flanges are separated so as to define a space therebetween greater than twice the thickness of molding material placed against the flanges; and
   d) a silicone bead element located in the space between the first and second flanges adapted to exert a compressive force on molding material urging it into contact with the first and second flanges.

2. The apparatus of claim 1 further comprising:
   a) a vacuum pouch located in the moulding cavity; and,
   b) means to draw a vacuum within the molding cavity so as to cause expansion of the vacuum pouch thereby exerting a force on the molding material urging it into contact with the mold portions.

3. The apparatus of claim 2 wherein the means to draw a vacuum within the molding cavity comprises:
   means defining a vacuum duct in communication with a vacuum source and in further communication with the molding cavity.

4. The apparatus of claim 3 further comprising means defining a plurality of orifices in communication with the vacuum duct and the space between the first and second flanges.

5. The apparatus of claim 1 wherein the connection means comprises a generally "U"-shaped connector attached between the first and second flanges.

6. The apparatus of claim 1 wherein the connection means comprises first and second angled portions formed on the first and second flanges, respectively.

7. The apparatus of claim 1 wherein the silicone bead element comprises molding surfaces adapted to bear against molding material located in the molding cavity.

8. The apparatus of claim 1 wherein the silicone bead element defines an internal cavity and further comprising means to supply a pressurized fluid to the internal cavity.

9. The apparatus of claim 1 wherein the first mold portion extends along a longitudinal axis and defines a generally arcuate molding surface extending approximately 240° about the longitudinal axis.

10. The apparatus of claim 9 wherein the first mold portion comprises a plurality of mold segments.

11. The apparatus of claim 9 wherein the second mold portion extends along the longitudinal axis and defines a generally arcuate molding surface extending approximately 120° about the longitudinal axis.

12. The apparatus of claim 2 wherein the first and second mold portions further comprise an end flange defining a base portion adapted to seal against an end of the vacuum pouch.

* * * * *